2,885,388

POLYMERIZABLE AMIDE-LIKE CONDENSATION PRODUCTS AND PROCESS FOR THEIR MANUFACTURE

Richard Sallmann and Arthur Maeder, Basel, Daniel Porret and Ernst Leumann, Monthey, and Otto Albrecht, Neue Welt, Switzerland, assignors to Ciba Limited, Basel, Switzerland, a Swiss firm No Drawing. Application August 21, 1953
Serial No. 375,832

Claims priority, application Switzerland August 29, 1952

16 Claims. (Cl. 260—86.1)

This invention provides a process for the manufacture of new polymerizable and, if desired, hardenable amide-like products, wherein (a) a condensation product of formaldehyde with a compound of the aminotriazine or urea group, which condensation product contains at least one free methylol group or at least one methylol group etherified with an alcohol of low molecular weight, (b) a nitrile or amide of an unsaturated polymerizable or copolymerizable acid, and (c) a compound containing at least one active hydrogen atom and capable of combining additively at the double bonds of unsaturated compounds, are reacted with one another in proportions such that the final product contains at least one double bond rendering the product polymerizable.

The process may be carried out by first condensing component (a) with component (b), and then additively combining a part of the double bonds of the condensation product so obtained with component (c). Alternatively, component (c) is first additively combined with component (b), and then the addition product is condensed with component (a), and, before, during or after the latter condensation, at least 1 mol of component (b) must condense so that there is present in the final product at least one double bond rendering the product polymerizable.

As formaldehyde condensation products of the aminotriazine group (component (a)) for use in the process of this invention there may be used in general all the products which contain at least one free methylol group or at least one methylol group etherified with an alcohol of low molecular weight. Among these products there may be mentioned above all reaction products of formaldehyde with 2:4:6-triamino-1:3:5-triazine, which latter compound is ordinarily known as melamine. Such condensation products may contain from 1 to 6 methylol groups, and they are usually a mixture of different compounds. There also come into consideration methylol compounds of melamine derivatives which contain at least one amino group, for example, methylol compounds of melam, melem, ammeline, ammelide or of halogen-substituted amino-triazines, such as 2-chloro-4:6-diamino-1:3:5-triazine; and also methylol compounds of guanamines such, for example, as those of benzoguanamine, acetoguan-amine or formoguanamine.

The ethers with alcohols of low molecular weight, which ethers may also be used as starting materials, may be derived from the aforesaid compounds and methyl alcohol, ethyl alcohol, a propyl alcohol or a butyl alcohol. For example, there may be used methyl ethers of methylolmelamines containing 3 to 6 methylol groups, of which 2 to 6 methylol groups are etherified. The formaldehyde condensation products suitable for the present process may contain further substituents. They may contain ester, ether or acid amide groups. Among the ester-like compounds there come into consideration, for example, those which are obtainable by esterifying a methylol-melamine, or an ether thereof with an alcohol of low molecular weight, with an aliphatic carboxylic acid of high molecular weight, such as lauric acid, palmitic acid, stearic acid, behenic acid, oleic acid or fatty acids of the last runnings, or with an aromatic carboxylic acid, such as benzoic acid and substitution products thereof, or with cycloaliphatic acid, such as abietic acid or naphthenic acids. As compounds which contain further ether groups there come into consideration those obtainable by etherifying the aforesaid methylol compounds, or their ethers with alcohols of low molecular weight, with aliphatic alcohols of high molecular weight or araliphatic alcohols, such as octyl, dodecyl, 2-butyl-octyl, cetyl, oleyl, octadecyl or benzyl alcohol. Starting compounds containing amide groups may be derived from acid amides or N-methylol-acid amides of the acids mentioned above in connection with the esters.

Furthermore, there may be used in the present process condensation products of formaldehyde and guanyl-melamines. Such condensation products may be derived from mono-, di- or tri-guanyl-melamine or mixtures of these compounds, which are obtainable by treating dicyandiamide in an inert solvent at a raised temperature with a gaseous hydrogen halide, and isolating the free amines from the resulting salts by the addition of a strong alkali. There may also be used for preparing the formaldehyde condensation products substituted guanyl-melamines.

The formaldehyde condensation products of the amino-triazine group may be used in a preponderatingly monomeric or partially condensed condition. The monomeric compounds are water-soluble, provided that they do not contain a large number of distinctly hydrophobic residues. A suitable starting material is, for example, a condensation product of unlimited solubility in water from 3 mols of formaldehyde and 1 mol of melamine or a derivative of hexamethylol-melamine containing about 3 methyl ether groups. The partially condensed products are generally only of limited solubility or quite insoluble in water. A product of limited solubility in water, which can be used in the present process, is obtainable, for example, by heating a solution of 1 mol of melamine and about 3 mols of an aqueous formaldehyde solution at a pH value of 8–9 at about 80° C. until 1 part of a cooled test portion just produces turbidity when mixed with 3–4 parts of cold water.

As formaldehyde condensation products of the urea group there may be used in the present process all those which contain at least one free methylol group or at least one methylol group etherified with an alcohol of low molecular weight. As compounds of the urea group there may be mentioned, for example, urea, thiourea and compounds which contain the atomic grouping

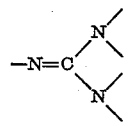

such as dicyandiamide, dicyandiamidine, guanidine, acetoguanidine or biguanide. A suitable starting material is, for example, dimethylol-urea.

The unsaturated nitriles or amides used as components (b) in the present process may be derived from any aliphatic, cycloaliphatic, araliphatic or heterocyclic monobasic or polybasic carboxylic acids, which contain one or more double or triple bonds, and must be polymerizable or copolymerizable. There are advantageously used α:β-unsaturated carboxylic acid nitriles of the general formula

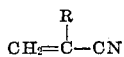

in which R represents hydrogen, chlorine or an alkyl radical; or the corresponding amides may be used. There may be mentioned, for example, furyl-acrylic acid nitrile, cinnamic acid nitrile, methacrylic acid nitrile, muconic acid dinitrile, crotonic acid nitrile, acetylene-dicarboxylic acid dinitrile, phenyl-propiolic acid nitrile, α-chloracrylic acid nitrile and especially acrylic acid nitrile. Acrylic acid nitrile or acrylic acid amide is advantageous owing to the ease with which these two compounds can be obtained and their reactivity.

As compounds containing at least one active hydrogen atom, which are capable of combining additively at the double bond of an unsaturated compound (components (c)), there come into consideration alcohols, phenols, mercaptans and especially primary or secondary amines. Among the hydroxyl and mercapto compounds which are capable of combining additively, there may be used those of the aliphatic, aromatic, cycloaliphatic, araliphatic or heterocyclic series. Among those of the aliphatic series there come into consideration saturated, unsaturated, straight or branched chain alcohols and mercaptans containing, for example, one to ten carbon atoms, which in addition to the hydroxyl or mercapto group may contain further substituents, such as halogen atoms, carboxylic acid or sulfonic acid groups, or polyalkylene glycol radicals. There may be mentioned, for example, methyl alcohol, ethyl alcohol, propyl alcohol, isopropyl alcohol, allyl alcohol, butyl alcohol, secondary butyl alcohol, tertiary butyl alcohol, hexyl alcohol, 2-ethylbutanol, hydroxyethane sulfonic acid, allyl mercaptan, amyl mercaptan, thioglycollic acid and thioethylene glycol. The aromatic members of this class of compounds may be derived from any aromatic compounds, above all from benzene or naphthalene. They may also contain, apart from the hydroxyl or mercapto group, further substituents such as halogen atoms, alkyl groups, etherified hydroxyl groups, acylated or dialkylated amino groups. There may be mentioned phenol, ortho-meta-, or para-chlorophenol, 2:4-dichlorophenol, ortho-, meta- or para-cresol, halogenated cresols, para-bromophenol, naphthols, para-tertiary butyl-phenol, thymol, guaiacol, and also thiophenol and substitution products thereof. Among the araliphatic hydroxyl compounds there come into consideration above all benzyl alcohol and its nuclear substitution products, such as para-tolyl carbinol, and also tetrahydronaphthyl carbinols, such as ar-tetrahydro-α-and ar-tetrahydro-β-naphthyl carbinol or mixtures thereof.

As compounds of the heterocyclic series there may be mentioned 2-mercapto-thiazoline, 2-hydroxybenzthiazole and 2-mercaptobenzthiazole.

There may also be used for the additive combination inorganic sulfur compounds, such as alkali bisulfites. Of special interest, however, is the additive combination of primary or secondary amines, because in this manner products having a basic character can be obtained, which are very desirable for many purposes. As primary or secondary amines there come into consideration for use in the present process aliphatic, aromatic, hydroaromatic, araliphatic or heterocyclic amines. As aliphatic amines there are especially useful alkylamines, dialkylamines, hydroxyalkylamines, bis - (hydroxyalkyl) - amines and N':N'-dialkyl-alkylene diamines. There may also be used either straight chain or branched chain saturated or unsaturated members of this group of compounds containing, for example, 1–18 carbon atoms. Among these compounds there are especially suitable those containing 1–4 carbon atoms in a carbon chain. There may be mentioned, for example, methylamine, ethylamine, propylamine, isopropylamine, butylamine, isobutylamine, allylamine, mono- or di-ethanolamine, propanolamines, di-isobutylamine, N':N'-diethyl-ethylene diamine, and also polyalkylene polyamines, such as diethylene triamine, triethylene tetramine, tetraethylene pentamine or polyalkylene polyamines of higher molecular weight. However, there also come into consideration aliphatic amines substituted in the alkyl radical, such as amino-carboxylic acids or amino-sulfonic acids, for example, alanine or taurine.

Among the hydroaromatic amines there may be mentioned, for example, cyclohexylamine, dicyclohexylamine and N-methyl-cyclohexylamine.

The araliphatic amines may be derived advantageously from benzylamine, and there may be mentioned benzylamine itself and its nuclear substitution derivatives substituted, for example, by halogen atoms, or alkyl or alkoxy groups.

The aromatic amines may be mono- or poly-nuclear and, if desired, may contain further substituents. There are advantageously used aniline and its nuclear substitution products such, for example, as ortho- or para-toluidine, various chloranilines, ortho- or para-anisidine or the like. There may also be used naphthyl amines, such as α- or β-naphthylamine and nuclear substitution products thereof.

The heterocyclic amines to be used may contain one or more hetero-atoms. There may be mentioned piperidine, α-pipecoline, morpholine, pyrrolidine, imidazole, piperazine, benzimidazole, 2-aminothiazole, 5-aminotetrazole and tetrahydroquinoline.

If a basic character is to be imparted to the condensation products of the invention without substantial increase in the size of the molecule, there are advantageously used for the additive combination secondary amines containing one amino group; if, on the other hand, it is desired to produce cross-linked or cross-linkable products, it is of advantage to use for the reaction primary amines; and for the production of products the formation of which involves an increase in molecular size in a linear arrangement, it may be of advantage to use di-secondary amines.

The condensation of the formaldehyde condensation products (components (a)) with the unsaturated nitriles (components (b)) is carried out in the presence of an acid condensing agent. As acid condensing agents there come into consideration advantageously strong inorganic acids such as phosphoric acid and especially sulfuric acid, which are used with advantage in anhydrous form. The condensing agent is advantageously added in excess. If desired, there may also be added to the reaction mixture an inert organic solvent, such as tetrahydrofurane or glacial acetic acid. The reaction temperature, which must be maintained for making the various amide-like compounds, cannot be predicted with certainty. It depends on the starting materials used. In a few cases it is of advantage to cool the reaction mixture with a mixture of ice and sodium chloride and to add the individual components in small portions. In other cases prolonged heating at a higher temperature, for example, 70–90° C., is necessary. The evolution of heat which takes place when all the components are brought together serves as an indication of the most favorable reaction conditions. After the condensation has finished, it is of advantage to pour the reaction mixture into water and neutralize the free acid. The amide-like condensation product so formed can then be separated by filtration or recovered by extraction with an organic solvent.

The additive combination of the compound containing at least one active hydrogen atom (component (c)) with the product of condensation of component (a) with component (b), or the additive combination of component (c) with component (b), may be carried out by methods in themselves known. Instead of the unsaturated, nitrile or amide, there may be used a corresponding β-halogen-, especially a β-chloro, carboxylic acid nitrile, for example, β-chloropropionic acid nitrile, and the compound containing active hydrogen or a reactive derivative thereof is reacted with such halogen compound.

The selection of the relative proportions of the reaction components and the choice of the components themselves depend entirely on the properties that are desired in the final product. If homopolymerizable products are desired there are used nitriles or amides which themselves possess this property. Such condensation products can generally be copolymerized with other unsaturated compounds. If, on the other hand, there are used nitriles or amides that are only capable of copolymerization, condensation products are obtained which can be polymerized only in admixture with other polymerizable bodies. If it is desired to produce compounds which, in addition to ther capacity for homo- or co-polymerization, are capable of undergoing condensation, that is to say, are capable of being hardened, it is necessary to use as starting materials those methylol-compounds or derivatives thereof, which are themselves capable of being hardened, and the relative proportions of the reaction components must be so chosen that at least one free methylol group or at least one methylol group etherified with an alcohol of low molecular weight remains in the final product. Such hardenable products are also obtained with advantage by using as starting materials in the present process methylol-compounds into which further methylol groups can be introduced, or ethers derived from such methylol compounds and alcohols of low molecular weight, carrying out the reaction with the nitrile or amide, and then introducing the further methylol groups by reaction with formaldehyde. The latter reaction with formaldehyde is carried out under the conditions usual for introducing methylol groups. Advantageously, the reaction product first obtained is heated with a concentrated aqueous solution of formaldehyde with the addition of a small quantity of an acid or a compound of alkaline reaction.

The newly introduced methylol groups may be left in the final product, or they may be reacted wholly or in part with an alcohol, an acid, an ester, an amide or an N-methylol-amide, whereby the properties of the products can be modified to a considerable extent.

Owing to the fact that the formaldehyde condensation products used in the present process are generally not unitary compounds, the amide-like bodies produced therewith are in many cases likewise not unitary compounds but are mixtures.

The polymerization of the amide-like products may be carried out in bulk, in solution or in emulsion, the conditions customarily used in polymerization technique being used. Thus it is of advantage to use polymerization catalysts. The usual compounds that catalyse polymerizations may be added, such as organic or inorganic per-oxides or per-salts, for example peracetic acid, acetyl peroxide, benzoyl peroxide, benzoyl acetyl peroxide, lauryl peroxide, cumene hydroperoxide, tertiary butyl hydroperoxide, para-methane hydroperoxide, hydrogen peroxide, percarbonates, persulfates or perborates. The proportions in which they are added are adjusted in known manner depending on the course of reaction desired and on the properties desired in the polymers. If desired, a plurality of agents catalysing the polymerization may be brought into action. The action of the polymerization catalysts may be enhanced by the simultaneous action of heat and/or actinic rays. It may indeed be possible to bring about the polymerization only by means of heat and/or actinic rays, that is to say, without the addition of catalytically active compounds. In order to control the speed of the polymerization reaction and the molecular weight of the polymers, so-called regulators such, for example, as mercaptans, terpenes, etc. may be added.

It is also of advantage to conduct the polymerization in the absence of air or oxygen and in the presence of an inert gas, such as nitrogen or carbon dioxide. So-called activators may also be used in addition to the above mentioned catalysts and regulators. Such activators are, for example, inorganic, oxidizable, oxygen-containing sulfur compounds such as sulfur dioxide, sodium bisulfite, sodium sulfite, ammonium bisulfite, sodium hydrosulfite and sodium thiosulfate. The presence of both activators and polymerization catalysts that liberate oxygen forms the so-called Redox system, which has a favorable influence on the polymerization process. As activators there may be used water-soluble aliphatic tertiary amines such as triethanolamine or diethyl-ethanolamine. The action of the polymerization catalysts can also be accelerated by the use of a heavy metal compound which is capable of existing in more than one stage of valency and is present in reduced condition, or by the addition of a complex cyanide of Fe, Co, Mo, Hg, Zn, Cu or Ag or a mixture of two or more such complexes. When the polymerization is carried out in emulsion, the monomeric compounds are advantageously emulsified with the aid of emulsifying agents. As emulsifying agents there come into consideration those of anion-active, cation-active or non-ionogenic character. Among the first-mentioned group there may be used, for example, acid sulfuric acid esters of fatty alcohols, sulfonated castor oil, higher alkyl sulfonates, higher oxyalkyl sulfonates, and especially sodium c-hydroxy-octadecane sulfonate, preferably one which is free from other salts; sulfo-dicarboxylic acid esters, for example, the sodium salt of sulfo-succinic acid dioctyl ester; and also higher alkyl-aryl sulfonates. Among the group of cation-active emulsifying agents there may be used, for example, compounds of fatty amines with acetic acid, hydrochloric acid or sulfuric acid, such as octadecylamine acetate or (dodecyl)-diethyl-cyclohexylamine sulfate; and also salts of diethylaminoethyl esters of higher fatty acids or salts of the type of oleylamidoethyl-diethylamine acetate $C_{17}H_{33}CONHC_2H_4NH(C_2H_5)_2OCOCH_3$. There are also suitable quaternary ammonium compounds, such as cetyl-dimethyl-benzyl-ammonium chloride, cetyl-trimethyl-ammonium bromide, para-(trimethyl-ammonium)-benzoic acid cetyl ester methosulfate, cetyl-pyridinium methosulfate, octadecyl-trimethyl-ammonium bromide or the quaternary compound of diethyl sulfate and triethanolamine tristearate.

Among the non-ionogenic emulsifying agents there may be mentioned polyglycol ethers of fatty acids, fatty amines or fatty alcohols of high molecular weight. There may also be used emulsifying agents having a pronounced wetting action, such as octyl-phenol polyglycol ethers and their acid sulfuric acid esters, and also lauryl alcohol polyglycol ethers or polyhydric alcohols partially esterified with higher fatty acids such, for example, as glycerine monolaurate or sorbitol monolaurate. There may also be used mixtures of emulsifying agents, and mixtures of emulsifying agents with protective colloids such as alginates, tragacanth, agar-agar, polyvinyl alcohols, partially esterified polyvinyl esters, proteins such as glue or gelatine, and also starch and starch derivatives, for example, dextrin, and furthermore cellulose ethers, polyethylene oxides, and also in general with water-soluble polymers or copolymers which contain hydroxyl, amino, carboxylic acid or carboxylic acid amide groups. Finally, protective colloids may be used alone.

If the polymerization is carried out in solution, there may be used solvents in which only the monomeric compounds are soluble and the polymers are insoluble; but there may also be used solvents in which the polymers also are soluble.

The polymerization may be carried out at ordinary temperature, but it is more advantageous to conduct the polymerization at a raised temperature. There are suitable, for example, temperatures of 40–95° C., and especially 55–90° C. During the polymerizations considerable quantities of heat are often liberated, so that suitable cooling devices should be provided in order to maintain the desired polymerization temperatures. This is especially necessary when a large quantity is polymerized in one batch. In order to utilise the liberated heat and to enable the polymerization temperature to be controlled more easily, it has been found advantageous in emulsion polymerization, for example, to place in the polymerization apparatus only a small portion of a given quantity of an emulsion to be polymerized and to initiate the polymerization in that portion. When the temperature of that portion of the emulsion has reached a certain height, for example, 60–70° C., the remainder of the emulsion is run in cold in such manner that the temperature can be maintained constant. Towards the end of the polymerization it is often necessary to supply external heat.

Depending on the polymerization conditions and the starting materials used the polymeric compounds are obtained in the form of viscous solutions, granulates or emulsions. It is possible to use the product of the polymerization directly without further working up. It is often preferable to work them up in a suitable manner. There may be added, for example, modifying substances, or organic or inorganic pigments or fillers. The monomeric compounds may also be polymerized in the presence of substrata. The polymerization may, for example, be carried out on a textile material. In this case the textile material is advantageously impregnated with a solution or emulsion of the monomer, and then the polymerization is brought about by heating the material with the addition of a polymerization catalyst. If polymerizable and hardenable amide-like compounds of the invention are used, the polymerization and the hardening may be carried out in two stages by first polymerizing the material and then hardening it. Both operations may also be carried out simultaneously. For the hardening suitable hardening catalysts are used. As such catalysts there may be used the usual hardening catalysts, for example, acids such as hydrochloric acid, sulfuric acid or formic acid; there may also be used salts of strong acids with weak bases, for example, ammonium salts of strong inorganic or organic acids, such as ammonium chloride, ammonium sulfate, ammonium nitrate, ammonium oxalate or ammonium lactate. When solutions in organic solvents are used there come into consideration catalysts which are soluble in the organic solvents, for example, strong organic acids, such as formic acid, acetic acid, chloracetic acid or compounds capable of splitting off acid under the action of heat, such as diethyl tartrate or triacetin.

As stated above, the products of the invention may, if desired, be polymerized with other unsaturated polymerizable compounds. As such compounds there come into consideration especially those containing the atomic grouping $CH_2=C<$, such as vinyl esters of organic acids, for example, vinyl acetate, vinyl formate, vinyl butyrate, vinyl benzoate, and also vinyl alkyl ketones, vinyl halides such as vinyl chloride, vinyl fluoride or vinylidene chloride, and vinyl-aryl compounds such as styrene and substituted styrenes, and furthermore compounds of the acrylic acid series such as esters of acrylic acid with alcohols or phenols, for example, ethyl acrylate, butyl acrylate, dodecyl acrylate, acrylonitrile or acrylic acid amide and its derivatives substituted at the amide nitrogen; and also analogous derivatives of methacrylic acid, α-chloracrylic acid, crotonic acid, maleic acid or fumaric acid, or finally acrylic acid or methacrylic acid itself. There may also be used polymerizable olefines such as isobutylene, butadiene, 2-chlorobutadiene or heterocyclic compounds containing at least one vinyl group. Binary or ternary copolymers or those of more complex structure can be made.

The products of the present process can be used either in monomeric form or in polymeric form for a very wide variety of purposes. They are generally applicable whenever condensation resins or polymerization resins are to be used. They may be used for the manufacture of masses to be moulded under pressure and moulded objects, films, adhesives or lacquers. Suitable copolymers can be made having rubber-like properties and are useful as substitutes for rubber which are resistant to benzene and benzine. Provided that they have been made from suitable starting materials, the products are suitable, inter alia, as auxiliaries in the textile, leather and paper industries. They can be used for the production of impregnations or coatings, for example, textiles can be rendered water-repellent with suitably substituted compounds. Basic products are also suitable for animalizing cellulosic textile materials, and as after-treatment agents for improving the fastness to washing and water of dyeings and prints produced with direct-dyeing dyestuffs, which owe their solubility in water to the presence of sulfonic acid or carboxylic acid groups. Such an after-treatment may be applied in conjunction with an after-treatment with a copper salt. Further applications of the new products are in the dyeing, printing or dressing of natural or artificial fibers with pigments.

In general finishes produced with the products of the invention possess good durability in use, and the products that are polymerizable and also hardenable possess especially valuable properties.

The following examples illustrate the invention, the parts being by weight unless otherwise stated, and the relationship of parts by weight to parts by volume being the same as that of the kilogram to the liter:

Example 1

A mixture of 12.5 parts of the finely pulverized reaction product of trimethylol-melamine and acrylonitrile described below, 5 parts of ethylene glycol monoethyl ether and 2.3 parts of diethylamine is converted into a slightly viscous solution by heating it at 45–50° C. for ½ hour, while stirring, and the solution is then heated for a further 45 minutes at 95–100° C.

The reaction product is an oil, which with the addition of an acid is easily soluble in water.

The condensation product of trimethylol-melamine and acrylonitrile is prepared as follows:

44 parts of a condensation product of unlimited solubility in water from 1 mol of melamine and 3 mols of formaldehyde are introduced, while rapidly stirring, at 5° C. into 250 parts of sulfuric acid of 93 percent strength in the course of 20 minutes, the temperature being maintained below 10° C. by cooling. 22 parts of acrylontrile are then introduced dropwise in the course of 15 minutes in such manner that the temperature does not rise above 20° C. When the addition is complete cooling is discontinued, and this causes the temperature of the reaction mixture to rise to 30° C. in the course of 10 minutes. The mixture is then heated for 45 minutes at 35° C. The mixture is then poured on to ice, the acid mass is then neutralized with a concentrated solution of caustic soda and the precipitated condensation product is filtered off, washed and dried in vacuo at 50° C. There is obtained a white powder which is soluble in hot water containing a small amount of formic acid.

Example 2

The procedure is the same as that described in Example 1, except that a mixture of 15.4 parts of the finely pulverized reaction product described below, 10 parts of ethylene glycol monoethyl ether and 2.5 parts of diethylamine is used. There is likewise obtained an oil which with the addition of an acid is easily soluble in water. The aforesaid reaction product is prepared by the procedure described in the last paragraph of Example 1, but with the use of 190 parts of sulfuric acid of 93 percent strength, 38 parts of a condensation product of unlimited solubility in water from 1 mol of melamine and 2 mols of formaldehyde, and 22 parts of acrylonitrile.

Example 3

6.65 parts of the condensation product described below are dissolved in 7 parts of pyridine, a solution of 1.75 parts of ethylene diamine in 3 parts of pyridine is added, and the whole is heated for 15 minutes at 45–50° C. The reaction product is precipitated, after cooling, by the addition of petroleum ether, then freed from adherent solvent at about 20° C., dissolved in 2 parts of water, and neutralized with glacial acetic acid. The acetate obtained in this manner is precipitated by the addition of acetone, then washed with acetone, and freed from solvent at room temperature. There is obtained a solid water-soluble mass, which yield sparingly soluble salts with acid dyestuffs.

The aforesaid condensation product is prepared as follows:

21.6 parts of a trimethylol-melamine of limited solubility in water and 17 parts of acrylonitrile are introduced in equal portions into 150 parts by volume of sulfuric acid of 93 percent strength at 0–10° C. with rapid stirring. After the addition is complete and when no further increase in temperature occurs, so that the reaction is finished for the greater part, the ice cooling is removed and the mixture is further stirred for 2 hours at room temperature. The clear solution is then poured on to ice and the reaction mixture is neutralized by the addition of solid sodium carbonate and then rendered weakly alkaline. The aqueous solution is then extracted by agitation with butyl alcohol. The butyl alcohol layer is separated and dried with sodium sulfate. After distilling off the butanol in vacuo there are obtained 27 parts of a slightly yellow-colored solid substance, which dissolves clearly in a mixture of alcohol and water or in dilute hydrochloric acid. The aqueous solutions polymerize on the addition of suitable catalysts.

The trimethylol-melamine of limited solubility in water may be prepared as follows: A solution of 1 mol of melamine and about 3 mols of aqueous formaldehyde solution are heated at a pH value of 8–9 and at about 80° C. until 1 part of a cooled test portion when mixed with 3–4 parts of cold water just produces turbidity.

Example 4

6.65 parts of the condensation product of trimethylol-melamine and acrylonitrile described at the end of Example 3 are dissolved in 7 parts of pyridine, a solution of 3.5 parts of diethylene triamine in 5 parts of pyridine is added, and the whole is heated for 15 minutes at 45–50° C. After cooling, the reaction product is precipitated by the addition of petroleum ether, then washed with petroleum ether, freed from adherent solvent at about 20° C., dissolved in 3 parts of water, and neutralized with glacial acetic acid. The acetate obtained in this manner is precipitated by the addition of acetone, then washed with acetone, and freed from solvent at room temperature. There is obtained a solid water-soluble mass, which yields sparingly soluble salts with acid dyestuffs.

Example 5

For the purpose of additive combination with an alcohol, a phenol, a mercaptan or an amine there may be used one of the following condensation products prepared from components (a) and (b) as hereinbefore defined:

(a) By the procedure described in the last paragraph of Example 1 a condensation product of unlimited solubility in water from 1 mol of melamine and 3 mols of formaldehyde is reacted with 3 mols of acrylonitrile.

(b) The procedure is the same as that described in the last paragraph of Example 1, except that there are used 300 parts of sulfuric acid, 62 parts of hexamethylol-melamine, and 34 parts of acrylonitrile, that is to say, 1 mol of hexamethylol-melamine and 3 mols of acrylonitrile are used. The white powder so obtained is fairly soluble in water and can be extracted therefrom with butanol.

(c) A mixture of 34 parts of acrylonitrile and 70 parts of a methyl alcoholic solution containing 75 percent of a partially condensed trimethylol-melamine trimethyl ether is added to 240 parts of sulfuric acid of 98 percent strength, while stirring well, in the course of 30 minutes. The temperature rises rapidly to 70° C. The mass is maintained at that temperature for 45 minutes, first by cooling and subsequently by heating. The reaction mixture is then poured on to ice, the mass having an acid reaction is neutralized with a concentrated solution of caustic soda, and the precipitated condensation product is filtered off. It is first precipitated in a somewhat greasy form and is rendered solid by trituration with water. There is finally obtained a solid white powder. The trimethylol-melamine trimethyl ether used in this case can be prepared by etherifying the trimethylol-melamine of limited solubility in water described at the end of Example 3 with an excess of methanol with the addition of a small amount of an acid, and after the etherification the acid is neutralized and the methyl alcoholic solution is evaporated to a dry content of 75 percent.

(d) The procedure is the same as that described under (c), except that a mixture of 70 parts of the solution of trimethylol-melamine trimethyl ether of 75 percent strength mentioned under (c) and 23 parts of acrylonitrile are used. These quantities correspond to 2 mols of acrylonitrile and 1 mol of the melamine ether. Instead of 23 parts of acrylonitrile only 11 parts thereof need be used. In the latter case only 1 mol of acrylonitrile is used for 1 mol of the melamine ether.

(e) While stirring strongly there is added to 280 parts of sulfuric acid of 98 percent strength a mixture of 34 parts of acrylonitrile and 135 parts of a resin solution, which consists of 80 percent of a partially condensed hexamethylol-melamine n-butyl ether containing about 4 butyl ether groups and 20 percent of butanol. During the addition the temperature rises to 60° C. and that temperature is maintained for 30 minutes. The mass is then poured on to ice and the condensation product is isolated in the manner described in the preceding examples. There is obtained a brownish colored powder. The quantities of acrylonitrile and melamine ether used in this case correspond to three mols of acrylonitrile and one mol of the ether.

(f) The procedure is the same as that described under (c), except that 280 parts of sulfuric acid of 98 percent strength, 99 parts of a hexamethylol-melamine trimethyl ether and 84 parts of acrylonitrile are used, which corresponds to 3 mols of the nitrile and 1 mol of the melamine derivative. There is obtained a white amorphous powder.

(g) 380 parts of dimethylol-melamine are introduced, while stirring, into 1920 parts of sulfuric acid of 93 percent strength in the course of 40 minutes at a temperature below 10° C. 220 parts of acrylonitrile are then introduced dropwise in the course of 30 minutes, the temperature being maintained below 20° C. by cooling. After allowing the reaction mass to stand for 3 hours at room temperature it is poured on to ice and the acid is neutralized with concentrated caustic soda solution. The reaction product is filtered off and washed with water. It is then suspended in 600 parts of an aqueous solution of formaldehyde of 40 percent strength, which has been given a pH value of 8.5–9 by the addition of a small quantity of caustic soda solution. The reaction mixture is then heated to 60° C., and after 10 minutes dissolution is complete. The solution is freed from impurities by filtration and then evaporated to dryness in a spray drier. There is obtained a powder which is completely soluble in water and is polymerizable. In this case the quantities of the reaction components are chosen so that there is used 1 mol of dimethylolmelamine, 2 mols of acrylonitrile and 3 mols of formaldehyde.

(h) 380 parts of dimethylol-melamine are condensed in the manner described under (g) with 110 parts of acrylonitrile by introducing them in 1650 parts of sulfuric acid of 93 percent strength. After pouring the reaction mixture on to ice and neutralizing the acid with concentrated caustic soda solution, the water-soluble condensation product is extracted by agitation with n-butanol. The butanol is then removed in vacuo, the residue is dissolved in 1000 parts of water and the solution is mixed with 500 parts of formaldehyde solution of 38 percent strength. The pH value of the solution is adjusted to 8.5–9 by the addition of a small amount of caustic soda solution, and the mixture is heated for 15 minutes at 60° C. The condensation product is then obtained in the form of a white water-soluble powder by drying it in a spray drier. In this case the quantities of the reaction components are so chosen that 1 mol of dimethylolmelamine, 1 mol of acrylonitrile and 4 mols of formaldehyde are used.

Example 6

In order to animalize cotton as ordinary cotton fabric free from dressing is impregnated twice on the foulard without intermediate drying with a solution, which has been prepared by dissolving 10 parts of the reaction product described in the first paragraph of Example 1, 10 parts of 2 N-acetic acid and 1 part of potassium persulfate in 500 parts of water. The fabric is squeezed to an increase in weight of 100%, dried at 90–100° C., and then heated for a further 5 minutes at 130° C. The fabric so treated can be dyed like wool with acid wool dyestuffs. A 2% dyeing with tartrazine is not washed off after being immersed in running water for 24 hours.

A certain cotton fabric which has been treated in an analogous manner with a solution of 10 parts of the reaction product described in the first paragraph of Example 2, 10 parts of 2 N-acetic acid and 1 part of potassium persulfate in 500 parts of water, is also suitable for being dyed with acid wool dyestuffs.

Example 7

A mixture of 100 parts of the reaction product described in paragraph (g) of Example 5, 50 parts of ethylene glycol monoethyl ether and 14.9 parts of diethylamine is heated to 50–55° C. for two hours while stirring and then to 90° C. for half an hour. Into the reaction solution of medium viscosity, which is first allowed to cool to 70° C. 25.8 parts of freshly distilled benzyl chloride are gradually introduced and the whole is stirred for 2 hours at this temperature.

The reaction product is a viscous oil which is completely soluble in water, except for some small resin portions. The latter remain in an emulsified state. The substance itself has emulsifying properties.

Unlike in the case of the non-quaternary compound obtained according to Example 1, an addition of an aqueous polyacrylic acid solution to the aqueous solution of the reaction product causes a colorless resin to precipitate.

On addition of about 0.1 percent of potassium persulfate to the neutral solution of the reaction product or to the solution which has been rendered weakly acid with acetic acid, polymerization and condensation set in promptly on heating to 60–80° C., an insoluble mass being separated.

Example 8

A solution of 10 parts of the viscous oil obtained according to the first paragraph of Example 7, and 10 parts of acrylic acid amide in 50 parts of water is heated to about 64° C. and mixed with 0.5 part of a 10 percent aqueous potassium persulfate solution. On further heating polymerization sets in soon, the whole of the solution assuming a stiff, insoluble, jelly-like consistency. On drying, with attendant further condensation, the polymerization product can be converted into a hard insoluble mass.

Example 9

A mixture of 20 parts of the reaction product described in paragraph (g) of Example 5, 10 parts of ethylene glycol monoethyl ether and 10.6 parts of hexadecyl-mercaptan is mixed with 0.4 part of a potassium hydroxide solution in methanol (300 grams per liter) and heated to 50° C. while stirring for half an hour.

The reaction product is a salve-like water-insoluble mass. When dissolved in a mixture of alcohol and ethyl acetate, the substance gradually polymerizes and condenses an addition of small quantity of benzoyl peroxide and heating.

Example 10

A mixture of 20 parts of the reaction product described in paragraph (g) of Example 5, 10 parts of ethylene glycol monoethyl ether and 8.2 parts of a mixture of N-alkyl-trimethylene diamines of the formula $$R \cdot NH - CH_2CH_2CH_2NH_2$$

wherein R stands for the alkyl radicals corresponding to the fatty acids occurring in soya bean oil, is heated to 65–70° C. while stirring for 3 hours.

The reaction product obtained is a faintly yellow-colored highly viscous liquid which is insoluble in water. On addition of acetic acid and heating it dissolves and on admixing 0.1 percent of potassium persulfate (calculated on the dissolved substance) and further heating a yellow-colored, flaky, insoluble polymer and condensate separates out.

Example 11

In the manner described in Example 10, a mixture of 20 parts of the product according to paragraph (g) of Example 5, 10 parts of ethylene glycol-monoethyl ether and 3.56 parts of morpholine are reacted together.

The reaction product is a colorless syrup which dissolves in water to give a clearer solution. After the addition of 0.1 percent of potassium persulfate (calculated on the substance used), the aqueous solution polymerizes promptly, even when gently heated.

Example 12

A mixture of 50 parts of the reaction product obtained as described in paragraph (g) of Example 5, 25 parts of ethylene glycol monoethyl ether and 8.7 parts of piperidine, when reacted as described in Example 10, yields a syrupy, colorless liquid which is insoluble in water. After neutralization with acetic acid there is, however, obtained a clear solution from which on addition of 0.1 percent of potassium persulfate and heating a polymeric, yellow, insoluble mass precipitated.

Example 13

When a mixture of 50 parts of the reaction product described in paragraph (g) of Example 5, 25 parts of ethylene glycol monoethyl ether and 10.75 parts of diethanolamine are caused to react in the manner described in Example 10, there is obtained a syrupy liquid which dissolves in water. The solution can be rendered neutral or acid with acetic acid.

The solution, whether alkaline or rendered neutral or acid with acetic acid, on heating and addition of a small quantity of potassium persulfate, separates an insoluble colorless mass which is a polymerization and/or condensation product of the compound.

Example 14

A mixture of 20 parts of the reaction product obtained according to paragraph (g) of Example 5, 10 parts of ethylene glycol monoethyl ether and 3.8 parts of aniline, freshly distilled over zinc dust, is caused to react in the manner described in Example 10.

The reaction product is a highly viscous liquid which on addition of water separates a colorless resin. The resin does ont dissolve on addition of dilute acetic acid.

With dilute hydrochloric acid, on the other hand, the reaction product can be converted into an orange-yellow solution from which, however, owing to the simultaneously commencing condensation, insoluble portions soon separate out. An addition of potassium persulfate to this hydrochloric acid solution and heating also induces polymerization with the formation of a brown-black insoluble mass.

*Example 15*

A mixture of 20 parts of the reaction product described in paragraph (g) of Example 5, 10 parts of ethylene glycol monoethyl ether, 3.85 parts of phenol and 0.4 part of methyl alcoholic potassium hydroxide solution (300 grams per liter), when caused to react as indicated in Example 10, yields a highly viscous liquid from which, on addition of water, a resin precipitates. The resin dissolves when it is heated. On addition of a small quantity of potassium persulfate to the solution, an almost colorless polymer precipitates.

*Example 16*

A mixture of 20 parts of the reaction product described in paragraph (g) of Example 5, 10 parts of ethylene glycol monoethyl ether and 7.9 parts of dibutylamine are caused to react in the manner described in Example 10. The reaction product is an oily liquid which after neutralization with 2-N-acetic acid can be diluted with water in any proportion.

When the solution is heated after the addition of a small quantity of potassium persulfate (e.g. 0.1 percent), a colorless polymer precipitates.

*Example 17*

20 parts of the reaction product described in paragraph (g) of Example 5 are heated to 70° C. while stirring for two hours with 10 parts of ethylene glycol monoethyl ether and 3 parts of diethylamine. 5.06 parts of methylol chloracetamide are then introduced into the reaction product and the whole is heated to 70° C. while stirring for another two hours.

The reaction product thus obtained is a syrupy liquid which readily dissolves in cold water. The product being a quaternary ammonium compound, the addition of an aqueous solution of polyacrylic acid causes a resin to precipitate.

In the aqueous solution of the reaction product, when a very small quantity of potassium persulfate (e.g. 0.1 percent calculated on the content of polymerizable compound) is added and the whole is heated to 60° C. polymerization and condensation soon occur in the course of which a colorless, flaky, insoluble mass separates out.

*Example 18*

A mixture of 20 parts of the reaction product described in paragraph (g) of Example 5, 20 parts of water, 5 parts of alcohol and 4.25 parts of sodium bisulfite is refluxed on the water bath for 1 hour while stirring. The solution is then filtered.

The clear solution of the new reaction product is miscible with water in any proportion. On addition of a small quantity of potassium persulfate and heating the whole to 50–60° C. the solution solidifies to form an insoluble jelly, owing to polymerization. The oil can be dried and yields, while undergoing after-condensation, a resin which is as hard as glass.

*Example 19*

A solution of 5 parts of the quaternary ammonium compound prepared according to Example 17 and 5 parts of acrylic acid amide in 20 parts of distilled water is heated to about 80° C. after the addition of 0.05 part of potassium persulfate. The solution soon solidifies to form a stiff jelly of a quite insoluble copolymer which can be dried and after-condensed at the same time. It thus becomes a hard colorless mass.

*Example 20*

A mixture of 5 parts of the reaction product prepared according to Example 9, 5 parts of n-butyl acrylate and 2 parts of alcohol is heated to 80–100° C. for about 15 minutes after the addition of 0.1 part of potassium persulfate. Polymerization and condensation occur while a colorless, quite insoluble resin is formed.

What is claimed is:

1. A polymerizable amide-like condensation product which has been obtained by first condensing in the presence of concentrated sulfuric acid as the reaction medium and in the absence of a polymerization catalyst (a) one mol of a compound selected from the group consisting of condensation products of melamine and formaldehyde containing at least two methylol groups and ethers thereof with saturated aliphatic low-molecular weight alcohols having at most 4 carbon atoms with (b) $n$ mols of a nitrile of an unsaturated at least copolymerizable monocarboxylic acid, and then reacting the condensation product thus obtained with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2.

2. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups with (b) $n$ mols of acrylonitrile and then reacting the condensation product thus obtained with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2.

3. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups and into which further methylol groups can be introduced with (b) $n$ mols of acrylonitrile, reacting the condensation product thus obtained with formaldehyde and then with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2.

4. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups and into which further methylol groups can be introduced with (b) $n$ mols of acrylonitrile, reacting the condensation product thus obtained with formaldehyde and then with (c) $n-1$ mols of a primary amine, $n$ being an integer of at least 2.

5. A polymerizable amide-like condensation product which has been obtained by first condensing in the presence of concentrated sulfuric acid as the reaction medium and in the absence of a polymerization catalyst (a) one mol of dimethylol melamine with (b) two mols of acrylonitrile, reacting this condensation product with three mols of formaldehyde and the product thus obtained with (c) one mol of aniline.

6. A polymerizable amide-like condensation product which has been obtained by first condensing in the presence of concentrated sulfuric acid as the reaction medium and in the absence of a polymerization catalyst (a) one mol of a condensation product of melamine and formaldehyde of limited solubility in water and having three methylol groups with (b) three mols of acrylonitrile, and then reacting the condensation product thus obtained with (c) two mols of ethylene diamine.

7. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups and into which further methylol groups can be introduced with (b) $n$ mols of acrylonitrile, reacting the condensation product thus obtained with formaldehyde and then with (c) $n-1$ mols of a secondary amine, $n$ being an integer of at least 2.

8. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups and into which further methylol groups can be introduced with (b) $n$ mols acrylonitrile, reacting the condensation product thus obtained with formaldehyde and then with (c) $n-1$ mols of a secondary aliphatic amine, $n$ being an integer of at least 2.

9. A polymerizable amide-like condensation product which has been obtained by first condensing in the presence of concentrated sulfuric acid as the reaction medium and in the absence of a polymerization catalyst (a) one mol of dimethylol melamine with (b) two mols of acrylonitrile, reacting this condensation product with three mols of formaldehyde and the product thus obtained with (c) one mol of diethylamine.

10. A polymerizable amide-like condensation product which has been obtained by first condensing in the presence of concentrated sulfuric acid as the reaction medium and in the absence of a polymerization catalyst (a) one mol of a condensation product of melamine and formaldehyde containing at least two methylol groups and into which further methylol groups can be introduced with (b) $n$ mols of acrylonitrile, reacting the condensation product thus obtained with formaldehyde and then with (c) $n-1$ mols of a secondary heterocyclic amine, $n$ being an integer of at least 2.

11. A polymerizable amide-like condensation product which has been obtained by first condensing in the presence of concentrated sulfuric acid as the reaction medium and in the absence of a polymerization catalyst (a) one mol of dimethylol melamine with (b) two mols of acrylonitrile, reacting this condensation product with three mols of formaldehyde and the product thus obtained with (c) one mol of morpholine.

12. A polymerization product which has been obtained by copolymerizing (A) a polymerizable amide-like condensation product which has been obtained by first condensing in the presence of concentrated sulfuric acid as the reaction medium and in the absence of a polymerization catalyst (a) one mol of a compound selected from the group consisting of condensation products of melamine and formaldehyde containing at least two methylol groups and ethers thereof with saturated aliphatic low-molecular weight alcohols having at most 4 carbon atoms with (b) $n$ mols of a nitrile of an unsaturated at least copolymerizable monocarboxylic acid, said then reacting the condensation product thus obtained with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2, with (B) a polymerizable ethylenically unsaturated monomeric compound.

13. A polymerization product which has been obtained by copolymerizing (A) a polymerizable amide-like condensation product which has been obtained by first condensing in the presence of concentrated sulfuric acid as the reaction medium and in the absence of a polymerization catalyst (a) one mole of a condensation product of melamine and formaldehyde containing at least two methylol groups with (b) $n$ mols of acrylonitrile, and then reacting the condensation product thus obtained with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2, with (B) a polymerizable unsaturated monomeric compound containing the atomic grouping $CH_2=C<$.

14. A polymerization product which has been obtained by copolymerizing (A) a polymerizable amide-like compound which has been obtained by first condensing in the presence of concentrated sulfuric acid as the reaction medium and in the absence of a polymerization catalyst (a) one mol of dimethylol melamine with (b) two mols of acrylonitrile, reacting this condensation product with three mols of formaldehyde and the product thus obtained with (c) one mol of hexadecyl mercaptan, with (B) n-butyl acrylate.

15. A polymerization process which comprises polymerizing on a substratum a polymerizable amide-like condensation product which has been obtained by first condensing in the presence of concentrated sulfuric acid as the reaction medium and in the absence of a polymerization catalyst (a) one mol of a compound selected from the group consisting of condensation products of melamine and formaldehyde containing at least two methylol groups and ethers thereof with saturated aliphatic low-molecular weight alcohols having at most 4 carbon atoms with (b) $n$ mols of a nitrile of an unsaturated at least copolymerizable monocarboxylic acid, and then reacting the condensation product thus obtained with (c) $n-1$ mols of a compound containing at least one active hydrogen atom bound to a hetero atom, which compound combines additively at the double bonds of unsaturated compounds and which is selected from the group consisting of primary amines, secondary amines, phenols, mercaptans and alkali metal bisulfites, $n$ being an integer of at least 2.

16. A polymerization process which comprises polymerizing on a textile material a polymerizable amide-like condensation product which has been obtained by first condensing in the presence of concentrated sulfuric acid as the reaction medium and in the absence of a polymerization catalyst (a) one mol of dimethylol melamine with (b) two mols of acrylonitrile, and reacting the condensation product thus obtained with (c) one mol of diethylamine.

References Cited in the file of this patent

UNITED STATES PATENTS

| | | |
|---|---|---|
| 2,279,497 | Sallmann et al. | Apr. 14, 1942 |
| 2,340,045 | D'Alelio | Jan. 25, 1944 |
| 2,476,065 | Robinson | July 12, 1949 |
| 2,512,671 | Novotny et al. | June 27, 1950 |
| 2,679,494 | Thomas | May 25, 1954 |

OTHER REFERENCES

Royals: "Advanced Organic Chemistry," pub. by Prentice-Hall Inc., Englewood Cliffs, New Jersey (1956), page 380 relied upon.

UNITED STATES PATENT OFFICE
CERTIFICATE OF CORRECTION

Patent No. 2,885,388                                                  May 5, 1959

Richard Sallmann et al.

It is hereby certified that error appears in the printed specification of the above numbered patent requiring correction and that the said Letters Patent should read as corrected below.

Column 4, line 73, for "rated, nitrile" read -- rated nitrile --; column 5, line 15, for "ther" read -- their --; column 8, line 48, for "acrylontrile" read -- acrylonitrile --; column 11, line 20, for "as ordinary" read -- an ordinary --; column 12, line 11, for "an addition" read -- on addition --; line 75, for "ont" read -- not --; column 15, line 71, for "said" read -- and --.

Signed and sealed this 27th day of October 1959.

(SEAL)
Attest:

KARL H. AXLINE                                                  ROBERT C. WATSON
Attesting Officer                                         Commissioner of Patents